United States Patent [19]

Vitaliano et al.

[11] Patent Number: 5,190,708

[45] Date of Patent: Mar. 2, 1993

[54] METHOD FOR THE REALIZATION OF A CERAMIC TILE, GLAZED OR ENAMELLED

[75] Inventors: Silingardi Vitaliano, Bologna; Ranuzzi Paolo, Spezzano Di Fiorano (MO), both of Italy

[73] Assignee: Azienda S.R.L., R. P. Color S.R.L., Bologna, Italy

[21] Appl. No.: 89,327

[22] Filed: Aug. 25, 1987

[30] Foreign Application Priority Data

Sep. 24, 1986 [IT] Italy .................. 3517 A/86
Mar. 5, 1987 [IT] Italy .................. 3373 A/87

[51] Int. Cl.$^5$ .................................... C04B 33/34
[52] U.S. Cl. .......................... 264/62; 264/60; 264/66
[58] Field of Search ......................... 264/62, 60, 66

[56] References Cited

U.S. PATENT DOCUMENTS

| | | | |
|---|---|---|---|
| 520,868 | 6/1894 | Strusholm | 264/62 |
| 2,241,705 | 5/1941 | Goodrich | 264/62 |
| 2,347,535 | 4/1944 | Bair | 264/62 |
| 2,910,760 | 11/1959 | Jackson | 264/62 |
| 3,628,989 | 12/1971 | Solmi | |

FOREIGN PATENT DOCUMENTS

| | | | |
|---|---|---|---|
| 0100954 | 7/1985 | European Pat. Off. | |
| 2404995 | 8/1975 | Fed. Rep. of Germany | 264/62 |
| 2529250 | 1/1977 | Fed. Rep. of Germany | 264/62 |
| 60-118661 | 6/1985 | Japan | 264/62 |
| 1569709 | 6/1980 | United Kingdom | |
| 2171402A | 8/1986 | United Kingdom | |

*Primary Examiner*—James Derrington
*Attorney, Agent, or Firm*—Darby & Darby

[57] ABSTRACT

The method involves the making of a crude ceramic tile from a clay material. A first way of producing this tile involves the application of a layer of frit, which is made up of monolithic granules of a spheroidal form, on the crude tile. The tile with the layer of frit subsequently undergoes a thermal process, which includes the firing both of the tile and the frit. A second way of producing this tile involves the application of a layer of frit, made up of monolithic granules of a spheroidal form, on a tile which has been previously fired. Then the file with its layer of frit, undergoes a thermal process which includes the firing of the frit.

8 Claims, No Drawings

METHOD FOR THE REALIZATION OF A CERAMIC TILE, GLAZED OR ENAMELLED

BACKGROUND OF THE INVENTION

The invention relates to a method for the production of a ceramic tile, glazed or enamelled, and tile obtained by this method.

The first method requires the formation of the raw tile, which is successively exsiccated and fired. In this way, a manufactured article known as a biscuit is obtained.

On the biscuit a layer of compound, better known as frit, is applied. Suitable additives or pigments have been added to the frit. All of these materials undergo, successively, a further firing which has the purpose of inducing structural modifications in the frit, this depending, obviously, on the nature of the substances making up the frit. As a result there is a fusion of these substances, or else a partial fusion of these substances according to a well known process of liquid phase sintering. The final consequence is the formation of a vitreous layer on the upper facing of the tile.

In conclusion a double firing is had, firstly of the raw tile (or support) and then of the frit, from which the name, "double firing," of the above method is taken.

The rest of the method requires firing of the tile and the frit in a single operative phase, from which comes the well known name of this method of "single-firing".

During firing of the tile, great quantities of gas originate from the tile (example: carbon dioxide), which gas enters the surrounding environment (which consists of the oven itself). The gas comes out of the surface of the tile, and, in particular, through the layer of the superimposed frit. Passage of these gases through the frit is possible as long as the frit is permeable, that is to say, before the softening of the frit.

The glaze, or enamel, obtained from firing of the frit is usually impermeable.

It is known that the frit for a colorless glazed tiling is obtained by thorough mixing, and by grinding together some acid substances (silicon, boron, phosphorous, etc.) with some basic substances (compounds of sodium, of potassium, of calcium, of lead etc.).

These substances are brought to a melting point in a melting pot, then poured out and cooled all at once, usually by immersion in water.

By means of the above-mentioned cooling, lumps of frit are obtained. From these lumps, by means of grinding, frit is obtained in the form of powder or granules.

In a first technique, the powdered frit, in a watery emulsion, with possible additives and thickening agents, is applied on the tile to glaze, or to enamel, in various ways. For example, the frit is sprayed on, brushed or sprinkled, or is applied through systems of serigraphy etc.

In a second case, the granules of frit, with eventual additives and pigments, are applied on the tiles dry with the help of suitable glues. This is carried out both by "single-firing" and "double-firing". In the case of the "single-firing" a suitable pressing of the frit can be anticipated.

The present invention fits into a special technical sector regarding the glazing, or enamelling, of ceramic tiling by use of frit in a granular form.

The grinding of the lumps of frit, by means of which the above-mentioned granules are obtained, also involves the forming of dust. A suitable plant is thus made necessary for recuperating and recycling of the dust in order to avoid waste as well as intolerable levels of pollution.

This last disadvantage, because a percentage of very fine dust always remains suspended in the air, means in the long run, for the operators of the equipment, the onset of illnesses related to tile production.

Also, it is to be pointed out that the equipment used for the grinding is subject to wear and tear, which is accentuated by the hardness of the lumps of frit. Thus the equipment requires continuous maintenance as well as replacement of the equipment itself.

The aforesaid granules are different in their forms and dimension, thus making it necessary to make a selection, by means of sieving, for the purpose of selecting the granules presenting dimensions-included between two values, minimum and maximum (example: observing a predetermined ration between these two values).

The granules even after sorting are of an extremely irregular form, each granule is different from the other, which means a great many disadvantages, listed as follows:

In fact, the above-mentioned sorting does not exclude the presence of needle-shaped granules. Therefore, the possibility exists that some of these needle-=shaped granules jut out from the border of the tile onto which a layer of frit has been applied.

With movement of the tile, a portion of a needle-shaped granule, jutting out from the border of this tile, can be intercepted, causing rotation of the above-mentioned granule (with its probable falling off) in respect to a vertical axis. This causes the removal of a portio of the frit in the area "swept" by the granule as a consequence of the aforesaid rotation, and as a result an imperfect tile, namely a discard, may be produced.

The above disadvantage manifests itself both with the single-firing and double-firing method.

In some cases of single-firing, application on the tile of a layer of a mixture of frit, china clay, alumina, zirconium hydroxide (known as "engobbio") prior to the application of the final frit, is foreseen. The function of the layer is to create a chemical insulating layer between tile and glaze. Even in this case the disadvantage mentioned above can manifest itself due to the present of "needle-shaped" granules.

With the above-mentioned granules it is practically impossible to eliminate dust. In fact, a percentage of this dust, even if small, remains imprisoned in between the granules and tends to spread itself inside the kiln dirtying the kiln itself as well as the equipment (example: operative lines) contained in the kiln. As the experts in the art know very well; this dust necessitates frequent stoppage of this equipment for necessary cleaning operations, with consequent aggravation of maintenance costs.

Additionally, the dust deposits itself on the vault of the kiln and tends, due to the heat, to melt, dripping down onto the underlying tiles, as a consequence, causing discards.

Finally the presence of this dust means, even for the operators situated in the operative zones where the frit is utilized, the danger of getting work-related illnesses.

In the "single-firing" techniques, as already mentioned, during the firing of the tile, gas escapes from the tile, which gas is given out to the surrounding environment through the layer of frit. The permeability of this } frit layer is not uniform because the granules are different one from another in form and size.

As the frit, when it is being glazed, becomes impermeable, for the reason mentioned above, the passage between the phase of permeability and that of impermeability comes about in a differentiated way from area to area. For example, the "needleshaped" granules, the dust, the small granules, becomes welded together and/or melt in the time before the melting of the remaining granules. This welding can cause occlusion of differentiated quantities of gas bubbles sin the coating of the tile, or else cause occlusion of bubbles in some areas and to complete degasification of the remaining area. In both cases, the coating of the tile has a relatively spongy quality which differs from area to area. All these disadvantages are well known to the experts of the art.

Differentiated melting of the granules can cause, when use is made of different frits, the formation of solid phases (so-called "unmelted compounds") that float on the frit. Once glazing has been completed, these solid phases can be distinguished as specks, which from an aesthetic point of view degrade the tile.

The varying granulometry of the frit is certainly not optimum with regard to application of this frit on the fired tile ("double-firing" or on the raw tile ("single-firing"). This results from the fact that the layer of frit which coincides with the underlaying facing of the tile is extremely irregular from area to area.

Levelling out of the layer of frit, in order to make the thickness of the layer itself constant, cannot be considered, as the jagged edges of the granules would cause them to be swept away by the equipment used for this levelling purpose with consequent forming of an undesired and unacceptable lining.

In this way, being unable to carry out levelling of this type, the thickness of the layer of frit is not uniform, with all the disadvantages arising from this, the substances used to carry out colorless glazing have already been discussed previously. In order to carry out colored glazing it is necessary, for example, to add (if they are not already part of the composition of the frit) metallic oxide colorings, for example, iron, oxide, cobalt, manganese, nickel oxide, etc. For the opalizing enamels, the addition is required, for example, of substances like tin bioxide, zirconium, fluorite, sodium fluoaluminate, and bone phosphate. In order to obtain special effects it is necessary to add particular additives having a base of boron, titanium, etc.

According to a known technique, the pigments (that is, the aforesaid oxides) and the additives are made up in a powdered form and applied, in the form of a thin veil, onto the granules of frit to which they are cemented, with a hot or cold process, by means of suitable glues.

Application of the undermentioned veil (pigments and additives) is influenced in a negative way by the interstices and jutting spikes of the layer of frit, as well as by the dust imprisoned in these interstices. Therefore, the thickness of the veil is not at all even, which is certainly not optimal for the results intended to be achieved.

The technique of carrying out decorations on a tile by means of granules on the layer of frit has been noted. The aesthetic effect, which is obtained once the glazing has been completed, depends on the form of a granule. A "needleshaped" granule and a granule of a different form, always of an irregular shape, give rise, respectively, to different aesthetic effects. In fact the "needleshaped" granules make the outline of the designs appear smudged.

The screens used for some types of decorations (example: serigraphic procedures) are subject to a great deal of wear, because of the abrasive action on these screens by the jagged points of the granules. This high wear, considering the cost of the screens themselves, which is not low, affects in a negative way the unit cost of the tile.

The holders, which are used for the distribution of the granules of frit, must be subject to constant maintenance as a consequence of their wearing out. This wear is accentuated by the jagged points present in the above-mentioned granules.

According to a further known technique, the aforesaid pigments and additives, in a powdered form, are mixed with the frit in the form of powder. The above-mentioned mixture of powders is then successively fixed, through suitable glues, making granular elements in an extremely irregular form, as well as having craters. As a result, the disadvantages mentioned above are noticeable.

Besides, the above-mentioned elements, during their manipulation, tend to free dust as a consequence of the inevitable breaking up of some of these elements; this affects, in fact, mixtures of powders which are not entirely agglomerated.

SUMMARY OF THE INVENTION

An object of the invention is to provide a method for producing a ceramic glazed tile, or enamelled tile, by which there is achieved an optimal application of frit on a raw tile ("single-firing") or fired tile ("double-firing"), a uniform permeability of the frit layer before glazing, and finally an optimal application of pigments and additives in powder form around the granules of the frit itself.

The proposed method uses frit made up of monolithic granules of a spheroidal form.

In the case of "single-firing", the frit is applied on a facing of a raw tile, exsiccated or not. In the case of "double-firing", the frit is applied on the facing of the already fired tile.

In both cases the advance production out of a crude ceramic tile in clay material is foreseen.

DESCRIPTION OF THE PREFERRED EMBODIMENT

More precisely in the case of "single-firing", the method requires, with the raw tile not exsiccated, the application of a layer of frit, made up of monolithic granules of spheroidal form, on the face of the tile; introduction into a kiln of the tile, and the firing and the cooling of the aforesaid tile and frit, this firing determining the formation of the fired enamelled coating of the tile.

When applying the frit on a raw tile, which is already exsiccated, only the firing of the tile and the frit is accomplished in the kiln, and the successive cooling of these.

In both of the aforesaid two forms of carrying out the method, the layer of frit, before introduction into the kiln of the combination tile-frit, can be pressed on to the underlying tile in an advantageous way. Besides, before application of the frit on the tile, a light layer called "engobbio", in order to chemically insulate the tile from the frit, can be applied as mentioned in the previous background explanation.

The method in the case of "double-firing" requires: the application of a layer of frit, made up of monolithic granules of spheroidal form, on a facing of the tile, which as been previously fired; introduction into a kiln of the fired tile, with its associated frit, for firing and successive cooling of the tile and frit, the firing of the frit determining the formation of the glazed or enamelled coating of the tile.

Utilization of monolithic granules of spheroidal form does not cause formation of dust when the frit is applied. This eliminates the danger of contracting work-related illnesses for the operators of the equipment, substantially reduces the costs of maintenance related to cleaning of the kiln equipment (in fact, this equipment is no longer dirtied by dust as in the known technique) with a positive effect on the productivity of the production lines of the kiln itself (as the lines must no longer be brought to a stop for cleaning because of dust). Non-production of dust eliminates the danger of scrappage due to dripping of frit from the ceiling of the kiln as this ceiling is no longer solid with dust. Finally, the underneath facing of the layer of frit, as it is made up by a great number of spheroidal granules, is extremely regular. Such regularity facilities the adherence of the frit to the underlying side of the tile. In this way, it ensures that the action of the glue used to fix the granules to the aforesaid facing is optimal.

Also, the upper facing of the layer of frit is extremely even, which, together with the absence of dust, facilitates the distribution on the upper facing of possible pigments and additives in a powder form and/or of decorative spheroidal granules. Therefore, fewer smudges of the decorations occur and there is also a better "definition" of these decorations.

The devices used for distribution of the monolithic granules of spheroidal form, are subject to very little wear and tear, only in a very slight way.

Utilization of monolithic granules of spheroidal form does not cause rejects as a result of intercepting of the granules themselves against objects in the kiln. In fact, the aforesaid granules, because of their particular form, are unable to jut out from the edges of the tile.

It is to be pointed out that the advantages which have been enumerated above can be obtained both with "single-firing" and with "double-firing".

As stated in the introduction, in the case of "single-firing" from a biscuit of the tile, gas develops that passes through the layer of frit as long as this is permeable.

With the utilization of monolithic granules of spheroidal form, the permeability of the layer of frit is uniform in any zone of a horizontal section of the layer itself. In fact, between the spheroidal granules, passages are created, and further, surface tension tends to maintain, during the firing, the typical spheroidal form of the granules. The spheroidal form maintains the layer of frit permeable for the greatest length of time possible, with a positive effect on the degasification of the body of the tile.

Maintenance of the spheroidal form means a much more regular melting of the spheroidal granules, which is extremely positive when different mixtures of frit are utilized. In fact, formation of so-called "not molten" solid phases, mentioned beforehand in the introduction, is very slight, practically none.

Obviously, permeability decreases, until it is of no effect, with the progressive glazing of the frit. This is effected without developing, for reasons mentioned above, of discontinuities in the permeability value in that section. The advantages are evident to the experts in the art.

Pigments and additives can be englobed in the monolithic spheroidal granules. In this case, it is necessary that the pigments and the additives be mixed with the basic and acid substances when they are melted in the melting pot to obtain the above-mentioned granules.

The extreme evenness with which the pigments and the additives are distributed on the upper facing of the layer of frit, in the case of application of pigments and additives in a powdered form on the granules, allows for production of a coating, which presents a constant tonality.

Decorative granules of spheroidal monolithic form arranged on the layer of frit produce aesthetic effects, as they are similar, that means to say spheroidal, to the form of the frit granules. Screens used in serigraphic processes are not especially subject to wear and tear, as the surface of the granules, being continuous, is in no way abrasive. Utilization of these decorative granules does not lead to the spreading of dust in the environment, neither are there any discards, as it is not possible for the granules to catch against guides suitably used in the kiln.

The optimization of the adhesion between tile and frit, of the distribution of pigments and additives on the granules, of the outlet of the gas developed by the body of the tile (only in the "single-firing"), are many positive factors that combine to realize an excellent coating.

Besides, the proposed method does not spread dust in the operative environment. Therefore, there is an absence of work-related illnesses, a positive effect on the maintenance cost as a consequence of the reduced stoppage for cleaning regarding the kiln and relevant equipment, a positive effect on the productivity of the operative lines of the oven, and absence of scrap due to elimination of the dripping frit from the ceiling of the kiln. The method does not involve catching the granules against guides suitably used in the kiln with the consequent advantages already mentioned. The method effects the limiting of the wearing out of the equipment for the application of the frit as well as for possible application of decorative granules arranged on the frit. In this last case, an excellent definition of ornamental figures is obtained as compared to what can be obtained by means of the known art.

It is intended that what has been described above is by way of example and not limitative. Therefore, any variations of the steps defining the method (for example, the monolithic spheroidal granules can be of different dimensions with regard to a prefixed ratio between maximum and minimum dimension which can be tolerated) are intended to form part of the protective scope of the invention, as claimed hereunder.

We claim:

1. Method for producing a glazed or enamelled ceramic tile from a crude ceramic tile made of a clay material, said method comprising: applying a layer of frit, consisting essentially of monolithic granules of a spheroidal form, on the facing of the crude tile, placing the frit containing tile in a kiln for essiccation, raising the temperature of the frit containing tile to a level where said clay material is essiccated while said frit is melted, surface tension maintaining the spherical shape of said frit, further firing the tile to convert the frit to a glaze or enamel coating, producing a glazed or enameled tile, and cooling said tile.

2. Method for producing a glazed ceramic tile, or enamelled ceramic tile from an essiccated crude ceramic tile made of a clay material, said method comprising: applying a layer of frit, consisting essentially of monolithic granules of spheroidal form, on a facing of said essiccated crude tile, placing the frit containing tile in a kiln, raising the temperature of the frit containing tile to a level where said frit is melted, surface tension maintaining the spherical shape of said frit, further firing the tile to convert the frit to a glaze or enamel coating, producing a glazed or enameled tile, and cooling said tile.

3. Method for producing a glazed or ceramic tile from a crude ceramic tile made of a clay material, said method including placing said crude tile in a kiln for essiccation, firing said crude tile and cooling said crude tile, said method comprising: applying a layer of frit, consisting essentially of monolithic granules of spheroidal form, on a facing of said fired tile, placing said frit containing tile in a kiln, raising the temperature of the frit containing tile to a level where said frit is melted, surface tension maintaining the spherical shape of said frit, further firing the tile to convert the frit to a glaze or enamel coating, producing a glazed or enameled tile, and cooling the tile.

4. Method according to claim 1 or 2, further comprising applying a layer of engobe to said tile before the application of said layer of frit.

5. Method according to claim 1 or 2 further comprising placing the frit containing tile into the kiln.

6. Method according to claim 1, wherein said layer of frit includes additives, pigments distributed in a powdered form or decorative spheroidal granules.

7. Method according to claim 1, wherein said monolithic granules of spheroidal form contain pigments and additives.

8. A method for producing a glazed ceramic tile as in claim 2, wherein said frit-containing tile, when placed in said kiln is at a low temperature as compared to the firing temperature of said kiln.

* * * * *